(12) United States Patent
Larcher

(10) Patent No.: US 8,146,863 B2
(45) Date of Patent: Apr. 3, 2012

(54) AIRCRAFT DOORWAY

(75) Inventor: David Larcher, Fontenilles (FR)

(73) Assignee: Airbus France, Toulouse (FR)

( * ) Notice: Subject to any disclaimer, the term of this patent is extended or adjusted under 35 U.S.C. 154(b) by 451 days.

(21) Appl. No.: 12/376,085

(22) PCT Filed: Jul. 26, 2007

(86) PCT No.: PCT/FR2007/051735
§ 371 (c)(1),
(2), (4) Date: Jun. 19, 2009

(87) PCT Pub. No.: WO2008/015360
PCT Pub. Date: Feb. 7, 2008

(65) Prior Publication Data
US 2009/0308977 A1 Dec. 17, 2009

(30) Foreign Application Priority Data
Aug. 1, 2006 (FR) .................... 06 53233

(51) Int. Cl.
*B64C 1/14* (2006.01)
(52) U.S. Cl. .................................... 244/129.5
(58) Field of Classification Search ............ 244/129.5, 244/129.4, 117 R, 119, 121, 118.5, 129.1, 244/132; 49/501, 504
See application file for complete search history.

(56) References Cited

U.S. PATENT DOCUMENTS

| | | | | |
|---|---|---|---|---|
| 2,349,907 A * | 5/1944 | Kos et al. | | 52/787.12 |
| 3,638,992 A * | 2/1972 | Forshee | | 296/39.1 |
| 3,791,073 A * | 2/1974 | Baker | | 49/249 |
| 5,171,510 A | 12/1992 | Barquet et al. | | |
| 6,059,230 A * | 5/2000 | Leggett et al. | | 244/129.5 |
| 6,110,567 A * | 8/2000 | Bird | | 428/178 |
| 6,444,392 B1 * | 9/2002 | Baker | | 430/264 |
| 6,488,235 B1 | 12/2002 | Young et al. | | |
| 6,568,637 B2 * | 5/2003 | Bluem et al. | | 244/129.5 |
| 2008/0257671 A1 | 10/2008 | Jacob et al. | | |

FOREIGN PATENT DOCUMENTS

| EP | 0 346 210 A1 | 12/1989 |
|---|---|---|
| EP | 1 607 272 A1 | 12/2005 |
| WO | WO 03/104080 A1 | 12/2003 |

* cited by examiner

*Primary Examiner* — Richard Price, Jr
(74) *Attorney, Agent, or Firm* — Patterson Thuente Christensen Pedersen, P.A.

(57) ABSTRACT

The invention concerns a doorway in an aircraft fuselage comprising a door frame in which a door is mounted, this frame comprising an outer framework, an inner framework and a core placed between the inner framework and the outer framework, capable of absorbing energy from an impact, the core being a stiffener made of composite material having an accordion shape.

10 Claims, 3 Drawing Sheets

AIRCRAFT DOORWAY

RELATED APPLICATIONS

The present application is a national stage entry of PCT Application No. PCT/FR2007/051735, filed Jul. 26, 2007, which claims priority from French Application No. 0653233, filed Aug. 1, 2006, the disclosures of which are hereby incorporated by reference in their entirety.

FIELD OF THE INVENTION

The invention relates to an aircraft doorway made of a composite material that both absorbs the energy from an impact to ensure that the door operates properly and also ensure the optimized use of composites both from a mechanical performance standpoint and from an industrial standpoint.

The invention has applications in the field of aeronautics and, in particular, in the field of doorway structures.

BACKGROUND OF THE INVENTION

Currently, in aircraft, particularly in passenger aircraft, the highest possible level of safety for the people on board, particularly the passengers, is the objective sought.

To ensure the safety of the passengers in case of a crash, rapid evacuation of the passengers is paramount. To do this, aircraft manufacturers seek to improve the safety of the aircraft doors, that is, to protect the doors to avoid any deterioration and deformation of the doors in case of impact in order to ensure that they operate properly. If the door is damaged, particularly during a crash, the passengers onboard the aircraft may not be able to leave the fuselage or may only be able to do so with difficulty. If the access door to the fuselage cannot open, it is necessary to wait for assistance from specialized emergency ground rescue forces to destroy the door in order to enter the passenger compartment of the aircraft and rescue the passengers, which may take a relatively long time. However, it has been shown that an airplane can catch fire quickly, in a matter of minutes, after a crash. On the contrary, if the door is protected and if it can operate and be opened by people onboard the aircraft without necessarily waiting for specialized forces to arrive, then uninjured passengers can leave the aircraft quickly and the rescue teams can enter the aircraft to help the victims as quickly as possible.

In an aircraft, there may be several exit doors, namely:
- one or more passenger doors in the front of the aircraft fuselage,
- one or more passenger doors in the rear of the aircraft fuselage,
- one or more doors in the center of the fuselage, in the passenger cabin, and
- one or more baggage compartment access doors under the aircraft fuselage.

In current aircraft, each door is mounted in a metal structure installed in the aircraft fuselage. This metal structure comprises frames and a set of stiffeners that together form a doorway. The door is thus mounted in a metal door frame, an aluminum frame, for example. Aluminum has the advantage of being a strong metal that is easy to shape and is able to bend under the effect of an impact to absorb the energy from the impact.

An example of a standard doorway is shown in FIG. 1. Doorway 1 is installed in a an aircraft fuselage 2 to support a door that is not shown in FIG. 1 and that is to be mounted in the empty space 3 of doorway 1. Doorway 1 comprises a frame consisting of an inner framework 5, an outer framework 6 and a core placed between inner framework 5 and outer framework 6. Inner framework 5 is intended to receive means for attaching the door. Outer framework 6 creates the connection between doorway 1 and fuselage 2. The role of core 4 is to absorb the energy from an impact. Core 4 connects inner framework 5 and outer framework 6.

Each framework 5 and 6 of the doorway 1 comprises two horizontal crosspieces, 5a, 5b and 6a, 6b respectively, and two vertical jambs, 5c, 5d and 6c, 6d respectively. The unit formed of an upper crosspiece 5a and a lower crosspiece 5b, of a right jamb 5c and a left jamb 5d, assembled together, constitutes a framework 5.

Traditionally, core 4 between the inner framework 5 and the outer framework 6 is produced using a number of stiffeners 4a, 4b, 4c, . . . 4n, called intercostal fittings. These intercostal fitting are independent components and, more specifically, horizontal stiffeners between the jambs of the doorway and vertical stiffeners between the crosspieces of the doorway. These intercostal fittings are attached on either side to inner framework 5 and to the outer framework 6. Currently, the metal frame of a doorway is optimized so that the intercostal fittings bend during an impact. By bending, the intercostal fittings absorb the energy from an impact, thus protecting the door. This type of metal frame thus makes it possible to comply with the safety standards for aircraft doors.

Aircraft manufacturers try to reduce the weight of the aircraft to the maximum extent possible in order to reduce the aircraft's fuel consumption. One of the ways to accomplish this is to select lighter materials.

The current trend in aeronautics is to replace metal components with components made of a composite material. In fact it is well known that composite materials make it possible to reduce the weight of the aircraft and therefore reduce its fuel consumption. However, in the case of a doorway, it is not sufficient to replace aluminum with a composite material. Indeed, replacing the aluminum intercostal fittings with intercostal fittings made of a composite material would present a problem with respect to energy absorption, for composite materials have a low energy absorption capacity. A composite material subjected to high pressure does not bend. It breaks. In the event of a crash, the stress in a doorway such as the one that has just been described, but with intercostal fittings made of a composite material, would be completely transferred to the door with risks of deformation that could prevent its subsequent operation. The energy from the impact would therefore not be absorbed by the doorway, which would result in the deterioration of the door.

Additionally, the standard architecture causes the stiffeners to undergo shearing action near the base, which is the weak point of composite materials.

Furthermore, making intercostal fittings out of a composite material to produce a doorway as described earlier would be relatively costly from a production standpoint. Manufacturing a high number of intercostal fittings and attaching each fitting between the inner and outer frameworks would result in too great an increase in production costs and in production cycles that are too high compared with current demands.

SUMMARY OF THE INVENTION

Embodiments of the invention specifically seeks to remedy the disadvantages of the technique presented previously. To this end, the invention proposes a doorway in which the core of the frame is made of a composite material with a continuous shape capable of absorbing the energy of an impact, with a reduced number of parts to ensure production at a good price and with preferred drainage of the tensile/compression stresses for optimized mechanical performance for the composites. To accomplish this, the core of the frame has an accordion shape.

More specifically, embodiments of the invention relate to a doorway in an aircraft fuselage comprising a door frame in which a door is mounted, this frame comprising:
- an outer framework,
- an inner framework, and
- a core placed between the inner framework and the outer framework capable of absorbing energy from an impact, wherein the core is a stiffener made of composite material having an accordion shape.

Embodiments of the invention can comprise one or more of the following features:
- the accordion-shaped stiffener includes a succession of V-shaped and inverted V-shaped bellows.
- each bellows of the accordion-shaped stiffener has a rounded top.
- the accordion-shaped stiffener is made of a single piece.
- the piece forming the accordion-shaped stiffener comprises four accordion-shaped sides connected by crenel-shaped corners.
- the accordion-shaped stiffener comprises at least two independent stiffener components placed end to end between the inner and outer frameworks.
- the accordion-shaped stiffener comprises two vertical stiffening components and two horizontal stiffening components.
- the stiffener is attached to the outer framework and/or the inner framework by the tops of its bellows.
- the composite material out of which the accordion-shaped stiffener is made comprises carbon fibers.
- the composite material out of which the accordion-shaped stiffener is made comprises Kevlar fibers.
- the accordion-shaped stiffener is made using an RTM process.

The invention also concerns an aircraft fuselage equipped with a doorway as described earlier.

The invention also concerns an aircraft comprising a doorway as described earlier.

DETAILED DESCRIPTION OF THE DRAWINGS

Figure 1:
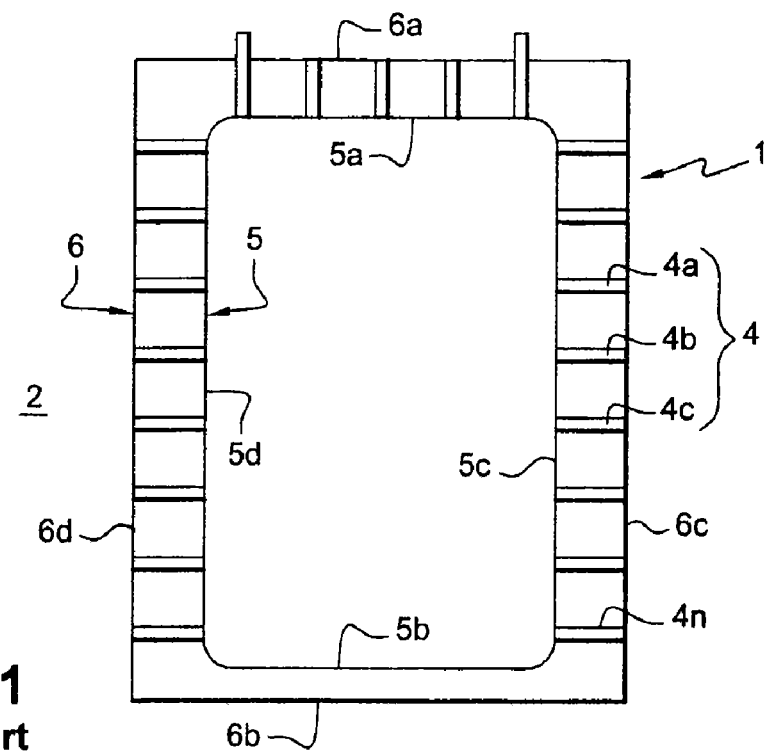
FIG. 1 depicts a standard aluminum doorway.
Figure 2:
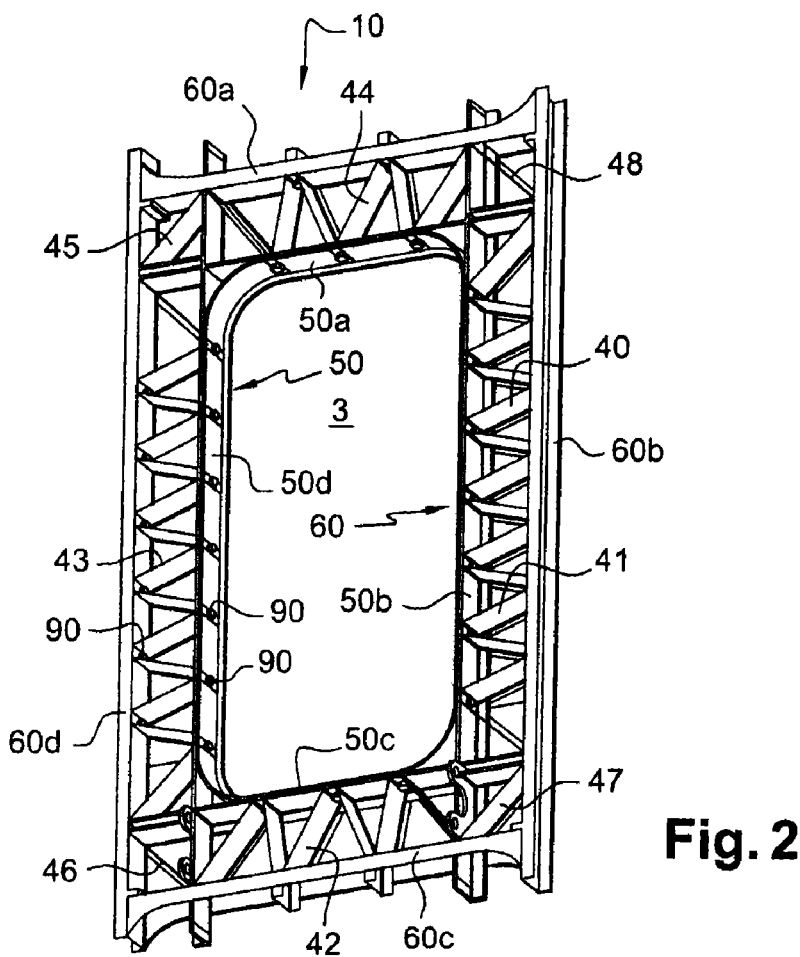
FIG. 2 depicts a doorway according to an embodiment of the invention.

FIG. 2 depicts an example of a doorway for an aircraft fuselage according to an embodiment of the invention. The doorway represented in FIG. 2 is a doorway of a passenger cabin. It should be noted, however, that all the doors allowing people, passengers or crew members, on board an aircraft to exit this aircraft may be produced using the doorway according to the invention. Doorway 10 comprises a frame formed of an outer framework 60 and an inner framework 50. These inner and outer frameworks may be identical to those of the prior art, that is, they are metal, made of aluminum, for example. They may also be made of any other material customarily used for aircraft door frames.

This frame also comprises a core 40 situated between the inner framework 50 and the outer framework 60. According to an embodiment of the invention, this core 40 is a stiffener made of a composite material. Stiffener 40 has an accordion shape. An "accordion shape" is a serrated shape comprising a succession of V-shaped and inverted V-shaped bellows formed one after the other. Accordion-shaped stiffener 40 is installed around the entire perimeter of the frame, that is, over the entire space situated between inner framework 50 and outer framework 60.

As can be seen in the example in FIG. 2, the inner and outer frameworks are more or less rectangular. Inner framework 50 may have rounded corners to assure better adaptation to the shape of the door in opening 3 of doorway 10.

Accordion-shaped stiffener 40 may be made of a single piece and mounted in one piece around inner framework 50, outer framework 60 then being attached around accordion-shaped stiffener 40. Accordion-shaped stiffener 40 is then attached to inner and outer frameworks 50 and 60 by means of standard composite mountings that sandwich stiffener 40 between frameworks 50 and 60 and a flange that is housed in the rounded part of the V in order to transfer the stresses evenly. In this case, stiffener 40 has four serrated sides. At each corner between two serrated sides, stiffener 40 has a crenel shape 45, 46, 47, 48, that is, an open square shape, the opening being opposite a corner of inner framework 50. In other words, the sides of the accordion-shapes stiffener are connected together by crenel-shaped corners.

In another embodiment of the invention, the accordion-shaped stiffener 40 includes several independent components placed end to end between the inner and outer frameworks. Accordion-shaped stiffener 40 can, for example, include four stiffener components, that is, two short components 42 and 44 placed horizontally between the two crosspieces 50a, 60a and 50c and 60c of the inner and outer frameworks, and two long components 41, 43 placed vertically between jambs 50b, 60b and 50d, 60d of the inner and outer frameworks. In this embodiment, each stiffener component is independent and manufactured independently. In the areas where the section of the fuselage is constant, the two horizontal stiffener components are identical and the two vertical stiffener components are identical. Each stiffener component is shaped like the stiffener component shown in FIG. 3, with a length suited to the length of the frameworks.

Figure 3:
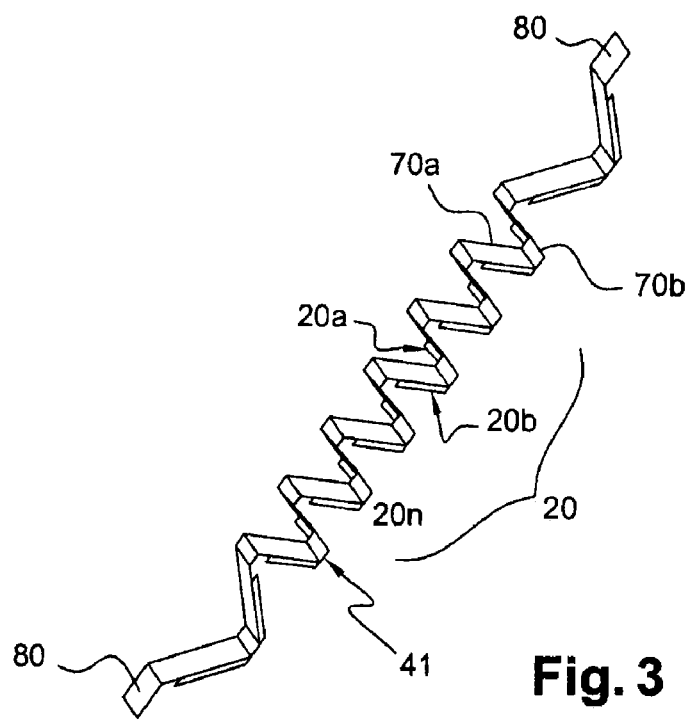
FIG. 3 depicts a core made of composite material in a doorway according to an embodiment of the invention.

In the example in FIG. 3, the component represented is vertical stiffener component 41.

Each stiffener component comprises a succession of V-shaped bellows 70a and inverted V-shaped bellows 70b. The bellows situated at both ends of the stiffener component have a wider V-shape to ensure insertion of the component in the corner of the inner and outer frameworks. This stiffener component can end on either side with a flat flap 80 intended to rest against one of the jambs or one of the crosspieces of the inner frame so that it can potentially be attached there. The stiffener can contain flaps 20a, 20b . . . 20n making it possible to connect the structure to the skin of the fuselage in order to take up the pressurization forces.

As shown in FIG. 2, accordion-shaped stiffener 40, whether it is made of a single piece or of several components, can be attached to inner and outer frameworks 50 and 60 by one or more attachment components. For example, stiffener 40 can be attached at the tip of each V-shaped or inverted V-shaped bellows as represented by reference 90 in FIG. 2.

The attachment components can be rivets or any other means of attachment generally used to attach components made of composite material.

As will be seen in more detail in the remainder of this description, bellows 70a, 70b of the accordion-shaped stiffener preferably have rounded tops in order to improve absorption of the energy of the impact by draining off the stresses. These rounded tops also make it possible to attach the stiffener between the two frameworks more easily.

Figure 4:
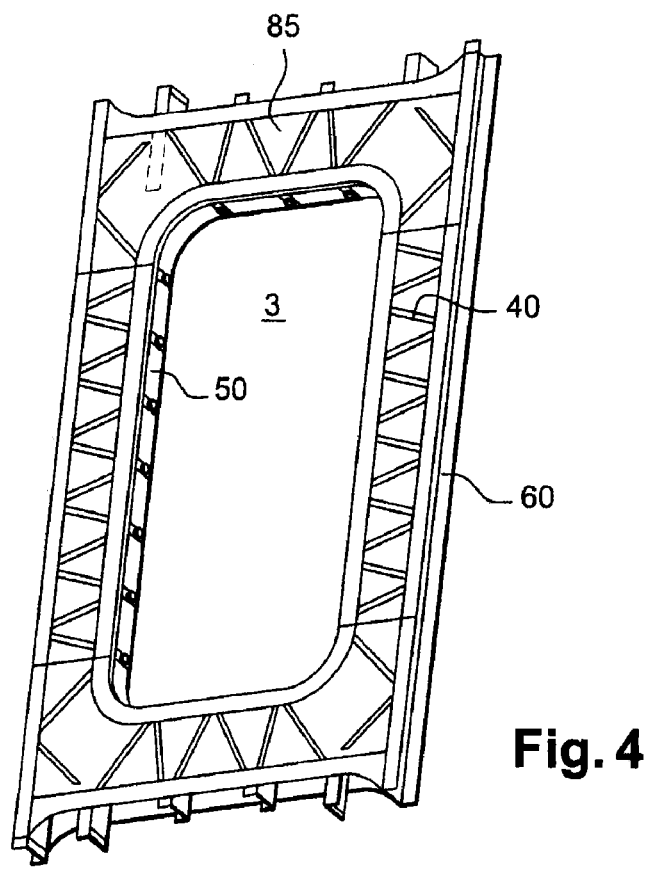
FIG. 4 depicts a doorway according to FIG. 2 as mounted in an aircraft fuselage.

FIG. 4 shows the doorway of FIG. 2 when it is covered with an external skin 85 of the fuselage. FIG. 4 therefore shows the doorway according to an embodiment of the invention, seen from the outside of the aircraft, when the door has not yet been mounted in space 3.

Figure 5:
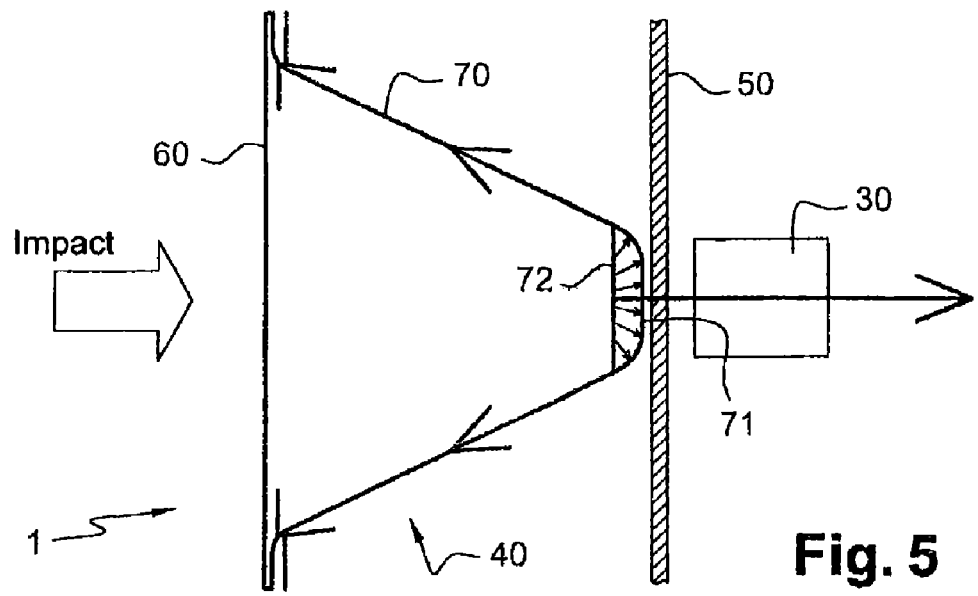
FIG. 5 is a schematic representation of the method for transmitting stresses in the stiffener.

FIG. 5 is a schematic representation of the stress drainage during normal operation. Thus, FIG. 5 shows a section of the doorway according to the invention with its outer framework 60, its inner framework 50 and a bellows 70 of accordion-shaped stiffener 40. Bellows 70 has a rounded top 71 that makes it possible to increase the contact between stiffener 40 and inner framework 50. Bellows 70 is sandwiched between a flange and inner framework 50. This makes it possible to transfer the stresses progressively and evenly between the frameworks and the stiffener. With contact surfaces rounded in this manner, the accordion-shaped stiffener does not have any sharp angles that could result in shearing. This rounding makes it possible to convert all the stresses into tensile stresses in the stiffener, which is much more favorable to composite materials.

Figure 6A:
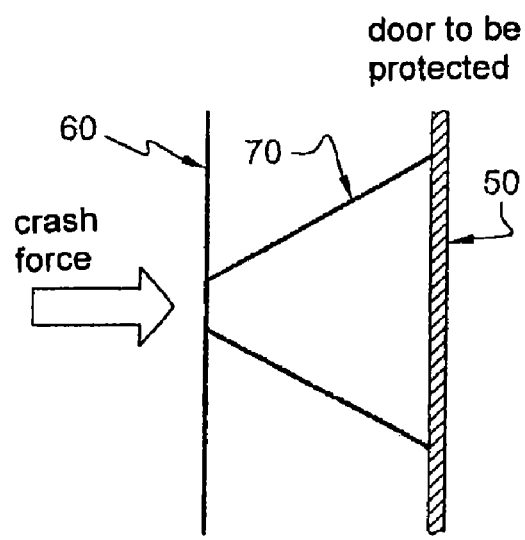
FIGS. 6A and 6B depict how the stiffener absorbs the energy in case of impact.
Figure 6B:
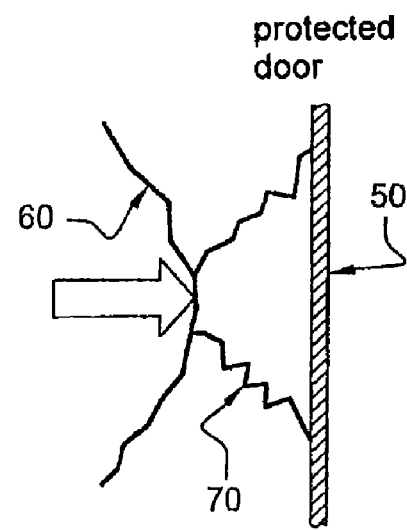

In FIGS. 6A and 6B illustrate how the stiffener absorbs the energy associated with an impact. The impact induces very strong stresses that will be drained off by the structure up to outer framework 60. Under the effect of these stresses, the stiffener 40 can bend to absorb the energy and protect the direct frame of the door or inner framework 50, thus allowing the evacuation of the passengers.

To accomplish this, the stiffener will be destroyed by progressive delamination. It thus places the direct doorway 50 in a protective cradle.

The composite material out of which the accordion-shaped stiffener is made can be formed of carbon fibers and epoxy resin. It can also be made using Kevlar®. These two types of composite material have the advantage of being particularly strong, which makes it possible to make a doorway capable of supporting a loaded door.

The accordion-shaped stiffener may be made using a vacuum injection technique called RTM (Resin Transfer Molding) process. This RTM process consists in cutting out the shape of the stiffener components or of the whole stiffener from a fabric of dry, uncoated fibers. This fabric can be selected and cut so that the fibers run in the lengthwise direction of the stiffener in order to take up a maximum amount of stress. This fabric is placed in a mold; a resin is injected under high pressure into this mold. The resin flows into the interstices of the fabric fibers, polymerizing these fibers according to the shapes of the mold, which produces the shape and the cohesion of the desired component. Producing components with an open section, that is, a large enough curve radius compared to the total surface area of the component, like the accordion-shaped stiffener, is relatively simple with this type of RTM process.

The door frame with a core made of composite material as has just been described not only has the advantage of reducing the total weight of the aircraft, but also increases energy absorption performance thanks to its specific geometry. Furthermore, it makes it possible to even out the loads connected with the pressurization of the airframe, which makes it possible to envision being able to glue the skin of the airplane to the doorway without using attachments. Furthermore, using composites in tensile stress situations makes it possible to increase their performance by a factor of ten compared to their use during shearing operations. Additionally, the production of this type of doorway requires many fewer parts than a standard doorway, which reduces the time required to assemble these parts and therefore the cost of labor.

The invention claimed is:

1. A doorway for an aircraft fuselage comprising a door frame inside which a door is mounted, the door frame comprising:
    an outer framework,
    an inner framework,
    a core positioned between the inner framework and the outer framework and adapted to absorb energy from an impact,
    wherein the core comprises a stiffener made of composite material having an accordion shape including a succession of V-shaped and inverted V-shapes bellows.

2. The doorway as claimed in claim 1, wherein each bellows of the accordion-shaped stiffener has a rounded top.

3. The doorway as claimed in claim 1, wherein the accordion-shaped stiffener is made of a single piece.

4. The doorway as claimed in claim 3, wherein the accordion-shaped stiffener comprises four accordion-shaped sides connected by crenel-shaped corners.

5. The doorway as claimed in claim 1, wherein the accordion-shaped stiffener comprises at least two independent stiffener components positioned end to end between the inner and outer frameworks.

6. The doorway as claimed in claim 5, wherein the accordion-shaped stiffener comprises two vertical stiffener components and two horizontal stiffener components.

7. The doorway as claimed in claim 1, wherein the stiffener is operably coupled to at least one of the outer framework and/or the inner framework by tops of the bellows.

8. The doorway as claimed in any claim 1, wherein the composite material contains carbon fibers.

9. An aircraft fuselage, comprising at least one doorway as claimed in claim 1.

10. An aircraft, comprising at least one doorway as claimed in claim 1.

* * * * *